(12) United States Patent
Foxglove

(10) Patent No.: US 11,131,317 B1
(45) Date of Patent: Sep. 28, 2021

(54) HYDRAULIC RAM USED FOR PUMP PACKING

(71) Applicant: Ned T Foxglove, Palmer, AK (US)

(72) Inventor: Ned T Foxglove, Palmer, AK (US)

( * ) Notice: Subject to any disclaimer, the term of this patent is extended or adjusted under 35 U.S.C. 154(b) by 0 days.

(21) Appl. No.: 16/948,869

(22) Filed: Oct. 3, 2020

(51) Int. Cl.
| | |
|---|---|
| *F04D 29/12* | (2006.01) |
| *B30B 1/32* | (2006.01) |
| *F04D 29/10* | (2006.01) |
| *F16J 15/18* | (2006.01) |
| *F04B 53/02* | (2006.01) |
| *F04B 53/16* | (2006.01) |
| *F04D 17/00* | (2006.01) |
| *F04D 1/00* | (2006.01) |

(52) U.S. Cl.
CPC .............. *F04D 29/126* (2013.01); *B30B 1/32* (2013.01); *F04D 29/106* (2013.01); *F04D 29/12* (2013.01); *F16J 15/184* (2013.01); *F04B 53/02* (2013.01); *F04B 53/164* (2013.01); *F04D 1/00* (2013.01); *F04D 17/00* (2013.01); *F04D 29/10* (2013.01); *F05D 2240/55* (2013.01)

(58) Field of Classification Search
CPC .......... F04D 29/12; F04D 29/126; F04D 1/00; F16J 15/184; F16J 15/18; F16J 15/26; B30B 1/32; F04B 53/02; F04B 53/164
See application file for complete search history.

(56) References Cited

U.S. PATENT DOCUMENTS

| | | | | |
|---|---|---|---|---|
| 3,947,044 A | * | 3/1976 | Friedrich | F04D 29/12 277/411 |
| 4,351,531 A | * | 9/1982 | Maasberg | F04B 53/164 277/516 |
| 4,991,495 A | * | 2/1991 | Loegel, Sr. | F04B 53/164 277/500 |
| 9,188,242 B2 | * | 11/2015 | Giove | F16K 51/00 |
| 9,347,488 B2 | * | 5/2016 | Thoma | F16C 33/16 |
| 10,760,685 B2 | * | 9/2020 | Iehl | F16J 15/183 |
| 10,914,382 B2 | * | 2/2021 | Komatsu | F16J 15/3484 |
| 2005/0082766 A1 | * | 4/2005 | Lovell | F16K 41/02 277/510 |
| 2020/0309145 A1 | * | 10/2020 | Madoche | F16J 15/185 |

* cited by examiner

*Primary Examiner* — Richard A Edgar
*Assistant Examiner* — Jackson N Gillenwaters
(74) *Attorney, Agent, or Firm* — Law Office of Scott C Harris, Inc

(57) ABSTRACT

A hydraulic ram used for maintaining pressure on pump packing. A pump packing closure mechanism is sized to extend around a shaft of a pump, and to close a space between the shaft of the pump and a housing. The closure mechanism presses against packing rings that surround the shaft of the pump. A hydraulic ram presses the closure mechanism against the packing rings.

11 Claims, 2 Drawing Sheets

HYDRAULIC RAM USED FOR PUMP PACKING

BACKGROUND

Centrifugal pumps and many other kinds of pumps, conventionally have packing rings stuffed into a packing box, which surrounds the shaft of the pump. The packing prevents liquids from escaping from the pump, but allows the pump shaft to rotate within the packing. The packing is conventionally installed around the pump shaft, and then covered with a seal (a gland follower) that is screwed to hold the packing into place.

Replacing packing is a tedious chore, since it requires removing the gland, and replacing the packing material, then replacing the gland and re-screwing it in place.

SUMMARY OF THE INVENTION

The inventor recognized a number of drawbacks with the current systems.

In recognition of the above, the inventor has invented a new form of packing compression.

According to an embodiment, a miniaturized water hydraulic ram is used to replace the nut and bolt system that is used in centrifugal pump packing.

DETAILED DESCRIPTION

Figure 1:
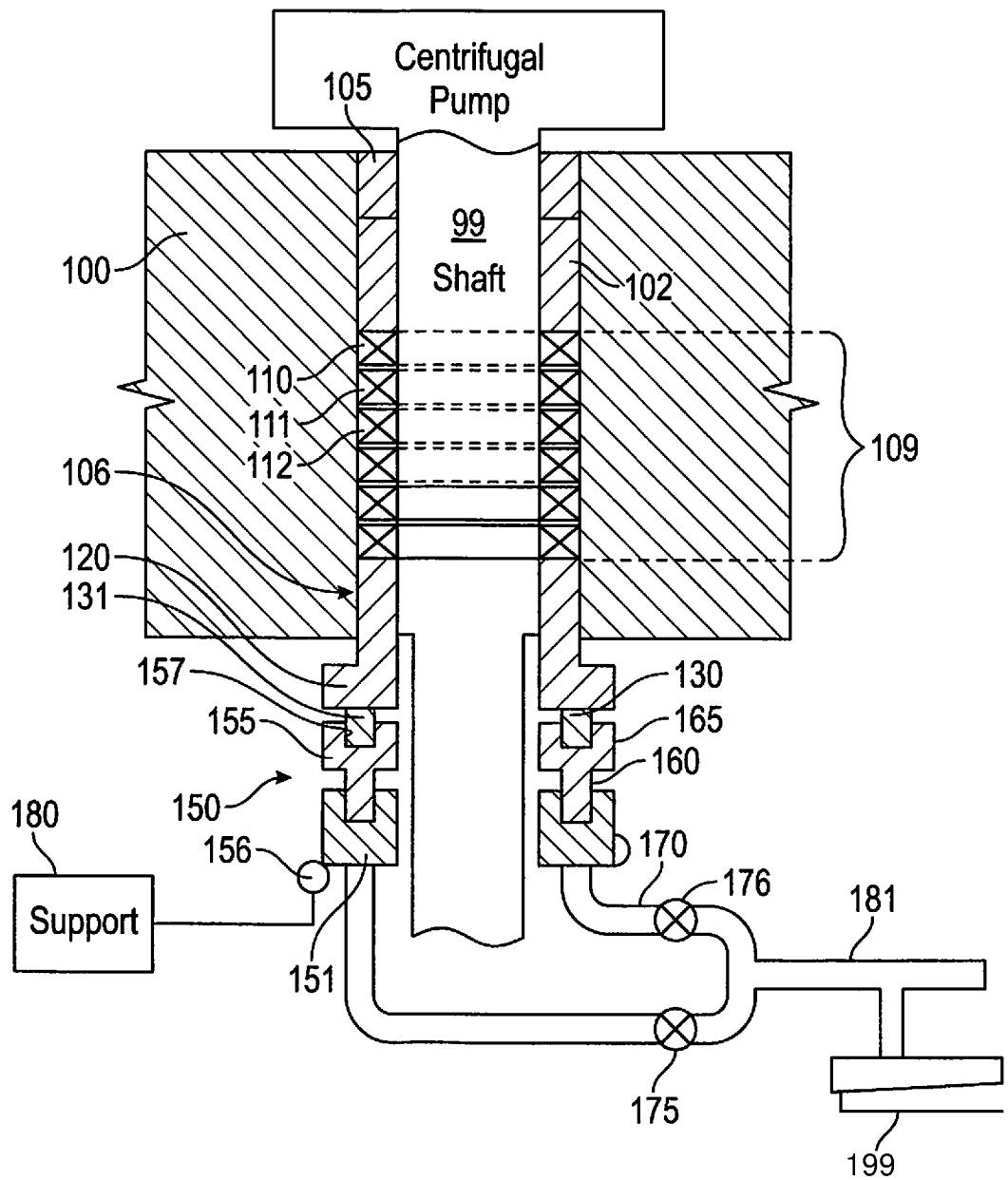
FIG. 1 shows an embodiment of a ram based centrifugal packing system using miniaturized hydraulic rams.

The present application describes a system of using a water hydraulic ram to maintain pump packing around the shaft of a pump. This application uses the word hydraulic to refer to fluid based pressurization, it being understood that at least in one embodiment, water is used instead of hydraulic fluid. A housing 100 is formed with a space 102 between the housing and a pump shaft 99. The space 102 is also referred to as the stuffing box area. The stuffing box area 102 is closed at one side with a throat closure 105, and is open at the other side 106.

The open side 106 is used to receive packing rings shown as 110, 111, 112. In reality, there can be any number of packing rings, although between 3 and 8 packing rings may be a conventional number.

The packing rings are stuffed into the space 102 held around the shaft 99 of the pump, to keep the pump watertight. The packing rings 109 are held into place at the open side 106 by a pump packing closure mechanism, here a gland follower 120. The gland follower 120 has attached extensions, which extend from a surface of the gland follower, e.g, gland bolts 130.

In an embodiment, a special miniaturized hydraulic ram is formed, formed of a piston 150 which has a top 155 with a hollowed out portion 157 at the top of the piston that is shaped to cover and surround the gland stud bolts 130. In one embodiment, the piston on the ram has a ¼" socket type hitch, so that the heads are interchangeable to accommodate different studded bolts on the packing rings.

A first hydraulic ram 150 has its motive part 151 attached at 156 to a support 180, which supports the ram 150 relative to the housing 100.

A second hydraulic ram 160 is located in a similar way, supported relative to the housing, and has its hollow out top 165 attached to the other gland bolt 130.

The hydraulic rams are driven by hydraulic power in a hydraulic hose 170. Each hydraulic ram or the first hydraulic ram has a stop valve 175 and the 2nd hydraulic ram has a stop valve 176. The hydraulic hose 170 is driven by a pump 199 fitted with quick disconnect couplings 181. In this way, the packing is held in place by hydraulic force rather than by the nut and bolt screw system as conventional. In this way, the packing system can be much more easily changed and more easily depressurized.

In an alternative embodiment, the packing system can press directly against a surface of the gland packing device, without touching the gland bolts. In another embodiment, the top of the hydraulic ram can actually screw onto the gland bolts, to keep them together and make it even easier to replace the gland bolts.

Once the pump is depressurized, the pressure is left off of the packing material, and the gland follower can then be removed, so that the packing can be removed and/or replaced. After replacement of the packing material, the gland follower is put back into place, and the hydraulic ram is initiated to tighten and/or torque the gland follower into place holding it properly against the packing rings.

In an embodiment, water hydraulics is used to provide the pressure. Water hydraulics is less expensive than oil and his or environmentally friendly. In colder temperature environments, glycol can be added to the hydraulics to prevent the freezing.

In another embodiment, the pump 199 can be pressure monitored, to provide a specified torque against the packing pieces.

In an embodiment, the main casing of the hydraulic ram is formed of carbon fiber. The smaller parts inside the pump may be made of stainless steel for durability and rust resistance. In other embodiments, the ram can be formed of cast iron, stainless steel, and aluminum.

This system can be used for any kind of pump packing. It can be used in ships and that use packing for the propellers, water treatment facilities that use centrifugal pumps, the fuel and oil industry, and in the food manufacturing industry. Since water or vegetable oil can be used as the hydraulic fluid, there will be no contamination.

The hand pump will be smaller and lighter for pump walk arounds, making it easier for technicians to adjust and repack the pumps.

This will prevent premature failures in pumps, and take less time to repack and adjust. In embodiments, different attachments can be used for different sized pumps. The parts can be welded on pumps for a permanent application. The pumps can also be engineering to make the ram head part of the packing system. they can be engineered initially in this way.

Because the pressure rating to keep the packing in place does not need to be high, it is easy to form the rams out of material such as carbon fiber, stainless steel and aluminum will not be needed.

Figure 2:
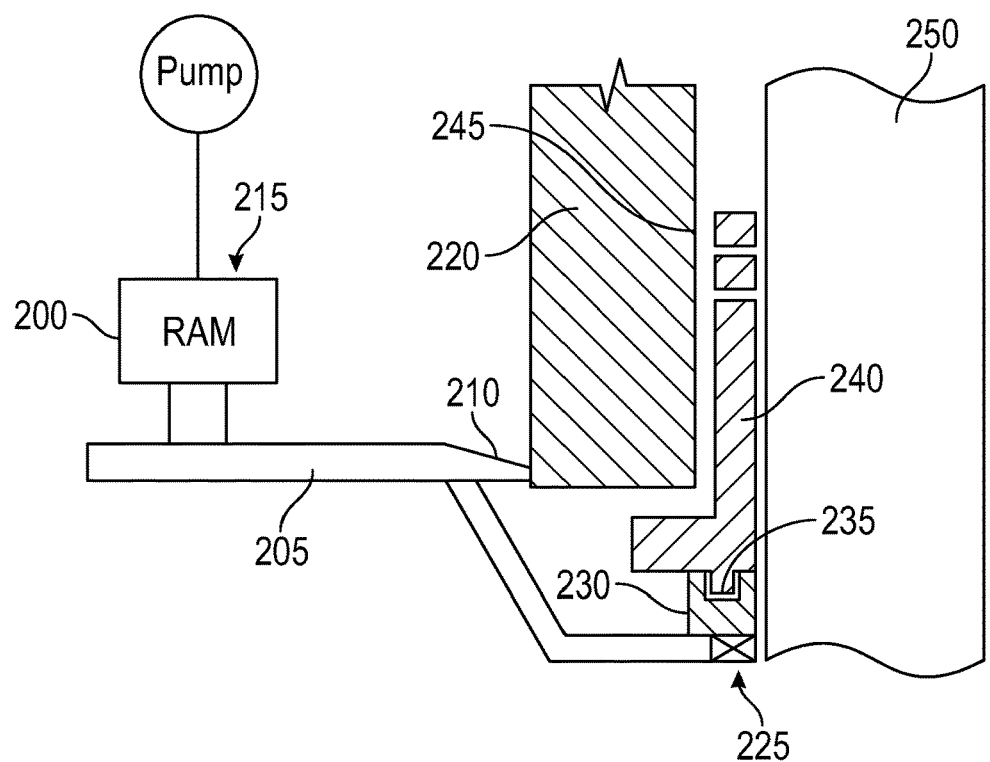
FIG. 2 shows a housing connection.
Figure 3:
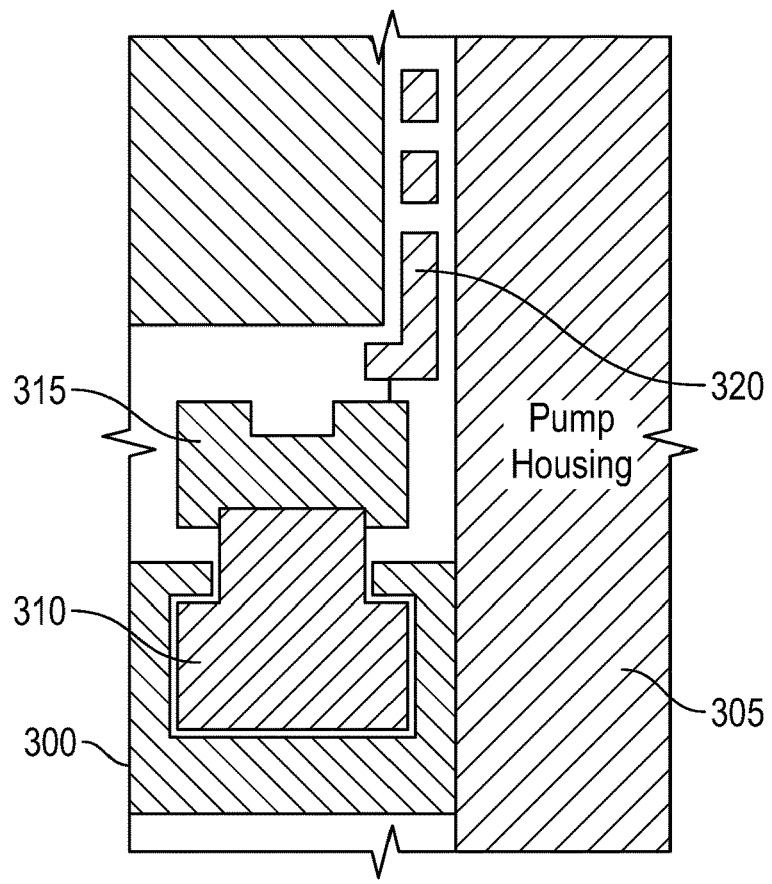
FIG. 3 illustrates a bracket for the housing attached to a housing of the pump.

FIG. 2 shows an alternative embodiment, where the packing force is applied from a ram 200 via a fulcrum or lever 205 that is attached at 210 to the housing 220. Force applied in the direction 215 is translated by the fulcrum 210 into a force 225 pressing the hollowed out head 230 against the gland stud bolts 235 of the gland packing 240. The pin is preferably in the middle of the lever to provide swiveling action to reverse the compression action. The gland packing 240 holds the packing rings 245 into place between the housing 220, and the pump shaft 250. In this way, the housing is used as the support for the hydraulic ram In another embodiment, shown in FIG. 3, a bracket 300 is welded to the pump housing 305. In one embodiment, the bracket can be cast iron. The ram body 310 is located in the bracket, with its hollowed out top portion 315 pressing against the gland packing 320.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system for maintaining pressure on pump packing, comprising: a pump packing closure mechanism, sized to extend around a shaft of a pump, and to close a space between the shaft of the pump and a housing, having a first end to press against a plurality of packing rings that are located surrounding the shaft of the pump, and having a second end with first and second extensions thereon; a first hydraulic ram, having a first hollowed out end, sized to fit around the first extension of the pump packing closure mechanism, and having a second end, held to a support; a second hydraulic ram, having a first hollowed out end, sized to fit around the second extension of the pump packing closure mechanism, and having a second end, held to the support; a power source for the first hydraulic ram and for the second hydraulic ram, providing a hydraulic force to the hydraulic rams to hold the hollowed out ends in place around the first and second extensions of the pump packing closure mechanism, against the packing rings.

2. The system as in claim 1, further comprising a pump, having the shaft, and having the packing rings around the shaft.

3. The system as in claim 2, further comprising a housing, surrounding the shaft, and leaving a stuffing box area between surfaces of the housing and surfaces of the shaft, where both the pump packing rings and the pump packing closure mechanism extend into the stuffing box area.

4. The system as in claim 3, wherein the support is the housing.

5. The system as in claim 1, wherein the hydraulic rams are attached to the power source via quick connect and disconnect mechanisms.

6. The system as in claim 1, where the support is separate from the housing.

7. The system as in claim 1, wherein the hydraulic rams use water hydraulics to provide the hydraulic force.

8. The system as in claim 1, wherein each of the hydraulic rams has a housing which is formed of carbon fiber.

9. The system as in claim 1, wherein the first hollowed out ends of the hydraulic rams each include an outside surface that presses against a top surface of the pump packing closure mechanism, and an indented surface which is indented to press against the extension of the packing closure mechanism.

10. The system as in claim 1, wherein the extensions are bolts.

11. A method, comprising packing rings around the shaft of a pump, inside a stuffing box area between a housing and the pump; and using a hydraulic ram to press against a packing closure mechanism which hold closed the packing on the packing around shaft of a pump, wherein the hydraulic ram has a top section with a first hollowed out portion which presses against bolts in the pump packing closure mechanism that holds closed the stuffing box area.

\* \* \* \* \*